United States Patent
McCord et al.

(10) Patent No.: US 12,105,248 B2
(45) Date of Patent: Oct. 1, 2024

(54) BEAM-TILTING LIGHT SOURCE ENCLOSURES

(71) Applicant: Apple Inc., Cupertino, CA (US)

(72) Inventors: Michael K. McCord, San Francisco, CA (US); Mehmet Mutlu, Grover Beach, CA (US); Ryan J. Linderman, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/388,140

(22) Filed: Nov. 8, 2023

(65) Prior Publication Data

US 2024/0069241 A1 Feb. 29, 2024

Related U.S. Application Data

(60) Division of application No. 18/197,882, filed on May 16, 2023, which is a continuation of application No. 17/751,820, filed on May 24, 2022, now Pat. No. 11,686,877, which is a continuation of application No. 16/537,086, filed on Aug. 9, 2019, now Pat. No. 11,366,246.

(60) Provisional application No. 62/735,975, filed on Sep. 25, 2018.

(51) Int. Cl.
| | |
|---|---|
| *G01V 8/12* | (2006.01) |
| *F21V 3/02* | (2006.01) |
| *F21V 5/04* | (2006.01) |
| *F21V 17/10* | (2006.01) |
| *G01S 7/481* | (2006.01) |

(52) U.S. Cl.
CPC .............. *G01V 8/12* (2013.01); *F21V 3/02* (2013.01); *F21V 5/04* (2013.01); *F21V 17/101* (2013.01); *G01S 7/481* (2013.01); *G01S 7/4813* (2013.01)

(58) Field of Classification Search
CPC ..... G01V 8/12; F21V 3/02; F21V 5/04; F21V 17/101; G01S 7/481; G01S 7/4813
See application file for complete search history.

(56) References Cited

U.S. PATENT DOCUMENTS

| | | | |
|---|---|---|---|
| 4,701,613 | A | 10/1987 | Watanabe et al. |
| 5,560,245 | A | 10/1996 | Zettler et al. |
| 5,841,128 | A | 11/1998 | Shibuya et al. |
| 6,184,442 | B1 | 1/2001 | Ogura |
| 7,309,855 | B2 | 12/2007 | Nagasaka et al. |
| 7,336,368 | B2 | 2/2008 | Liao |
| 7,755,029 | B2 | 7/2010 | Tang |
| 8,946,620 | B2 | 2/2015 | Loong et al. |

(Continued)

*Primary Examiner* — Tony Ko

(74) *Attorney, Agent, or Firm* — Brownstein Hyatt Farber Schreck, LLP

(57) ABSTRACT

An optical module includes a beam-tilting light source enclosure. The enclosure is coupled to a substrate that includes a light emitter connected thereto. The enclosure has a geometry such that the enclosure has a first surface configured to couple substantially flat to the substrate and a second surface tilted with respect to the first surface and configured to couple substantially flat to a component of an electronic device through which the light is to project. The enclosure is optically transmissive and covers the light source when coupled to the substrate. In this way, the enclosure may be assembled and used in the electronic device by coupling the first surface to the substrate and coupling the second surface to the component.

20 Claims, 12 Drawing Sheets

(56) References Cited

U.S. PATENT DOCUMENTS

| | | |
|---|---|---|
| 9,383,229 B2 | 7/2016 | Chin |
| 9,465,442 B2 | 10/2016 | Rai |
| 9,596,397 B2 | 3/2017 | Rammah |
| 11,156,456 B2 | 10/2021 | Chen et al. |
| 11,366,246 B2 | 6/2022 | McCord et al. |
| 11,619,762 B2 | 4/2023 | McCord et al. |
| 11,686,877 B2 | 6/2023 | McCord et al. |
| 2008/0193117 A1 | 8/2008 | Cheng et al. |
| 2012/0187836 A1* | 7/2012 | Hashimoto ............. F21K 9/233 315/51 |
| 2013/0037702 A1* | 2/2013 | Minamikawa ........ H01L 25/167 250/221 |
| 2020/0370886 A1 | 11/2020 | Chen |
| 2023/0280492 A1 | 9/2023 | McCord et al. |

* cited by examiner

BEAM-TILTING LIGHT SOURCE ENCLOSURES

CROSS-REFERENCE TO RELATED APPLICATIONS

This application is a division of U.S. patent application Ser. No. 18/197,882, filed May 16, 2023, which is a continuation of U.S. patent application Ser. No. 17/751,820, filed May 24, 2022, now U.S. Pat. No. 11,686,877, which is a continuation of U.S. patent application Ser. No. 16/537,086, filed Aug. 9, 2019, now U.S. Pat. No. 11,366,246, which is a nonprovisional of and claims the benefit under 35 U.S.C. § 119(e) of U.S. Provisional Patent Application No. 62/735,975, filed Sep. 25, 2018, the contents of which are incorporated by reference as if fully disclosed herein.

FIELD

The described embodiments relate generally to light source enclosures for electronic devices. More particularly, the present embodiments relate to light source enclosures that tilt the axis of light beams with respect to an external surface of an electronic device in which they are used.

BACKGROUND

Many electronic devices use light sources. For example, many remote control devices use an infrared diode to transmit instructions to another device, such as a television or a set top box. By way of another example, many mobile electronic devices (such as smart phones, tablet computing devices, laptop computing devices, and so on) use light-emitting diodes (LEDs) as a flash or other light source for a camera, in a proximity sensor, and so on.

Light sources are often packaged in enclosures. The enclosures are typically configured such that an axis of an emitted light beam is perpendicular to a surface of the enclosure. Separate components or devices may be used to alter the direction of the beam.

SUMMARY

The present disclosure relates to beam-tilting light source enclosures. An optical module includes a beam-tilting light source enclosure. The enclosure is coupled to a substrate that includes a light emitter connected thereto. The enclosure has a geometry such that the enclosure has a first surface configured to couple substantially flat to the substrate and a second surface tilted with respect to the first surface and configured to couple substantially flat to a component of an electronic device through which the light is to project. The enclosure can be optically transmissive (e.g., optically transmissive to at least one wavelength of light) over a large range of wavelengths or only around the wavelength of the light beam and cover the light source when coupled to the substrate. In this way, the enclosure may be assembled and used in the electronic device by coupling the first surface to the substrate and coupling the second surface to the component. This may accomplish light tilting with substantially reduced assembly errors in a significantly less complex and more cost-effective fashion than other potential alternatives.

In various embodiments, an electronic device includes a cover and an optical module coupled to the cover. The optical module includes a substrate, a light emitter coupled to the substrate, and an optically transmissive enclosure coupled to the substrate over the light emitter. The optically transmissive enclosure includes a lens that shapes (or focuses, collimates, or otherwise shapes in any alternative way) the light emitted from the light emitter and an optical surface, through which the light from the light emitter travels, that is opposite the lens and positioned parallel to the cover and transverse to the substrate.

In some examples, the optically transmissive enclosure is a unitary structure. In various examples, the light emitter produces a measurable response to at least one of a reflection or a backscatter of the light onto itself. In some implementations of such examples, the electronic device is operative to detect at least one of a touch on or proximity of an object to the cover when the light emitter produces the measurable response to the at least one of the reflection or the backscatter of the light onto itself.

In various examples, the optically transmissive enclosure and the substrate form a sealed cavity around the light emitter. In various examples, the electronic device further includes an alignment mechanism, coupled to the cover, that defines an area in which the optically transmissive enclosure is at least partially positioned.

In some embodiments, an optical module includes a substrate; a light emitter coupled to the substrate; and a unitary optically transmissive enclosure, coupled to the substrate over the light emitter, including an optical surface that is oriented transverse to the substrate. Light emitted from the light emitter travels through the optical surface at a transverse angle with respect to the optical surface.

In some examples, the enclosure includes a lens that is opposite the optical surface and that shapes (or focuses, collimates, or otherwise shapes in any alternative way) the light. In various implementations of such examples, the lens is a shaped surface of the unitary optically transmissive enclosure. In various implementations of such examples, the light travels through the lens and the optical surface. In some implementations, a lens is coupled to an interior surface of the enclosure opposite the optical surface wherein the lens shapes (or focuses, collimates, or otherwise shapes in any alternative way) the light.

In various examples, the unitary optically transmissive enclosure further includes a flat surface that is adjacent the optical surface and parallel to the substrate. In some examples, the unitary optically transmissive enclosure further includes a first flat handling surface adjacent the optical surface and a second flat handling surface opposite the first flat handling surface. The first flat handling surface and the second flat handling surface are transverse to the optical surface.

In some embodiments, an optical module includes a substrate, a light emitter coupled to the substrate, and an optically transmissive enclosure molded to the substrate around the light emitter. The optically transmissive enclosure includes a curved exterior surface that functions as a lens and a coupling surface, adjacent the curved exterior surface, that is oriented transverse to the substrate. Light emitted from the light emitter is shaped (or focused, collimated, or otherwise shaped in any alternative way) as the light travels through the curved exterior surface at a transverse angle with respect to the coupling surface.

In some examples, the optically transmissive enclosure and the substrate completely surround the light emitter. In various examples, the optically transmissive enclosure further includes a planar surface that is parallel to the substrate and adjacent the curved exterior surface. In various examples, the optically transmissive enclosure is formed of a polymer. In some examples, the optically transmissive enclosure at least partially encapsulates the light emitter. In various examples, the light deflects when travelling through the curved exterior surface. In some examples, the curved exterior surface is convex with respect to the substrate.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
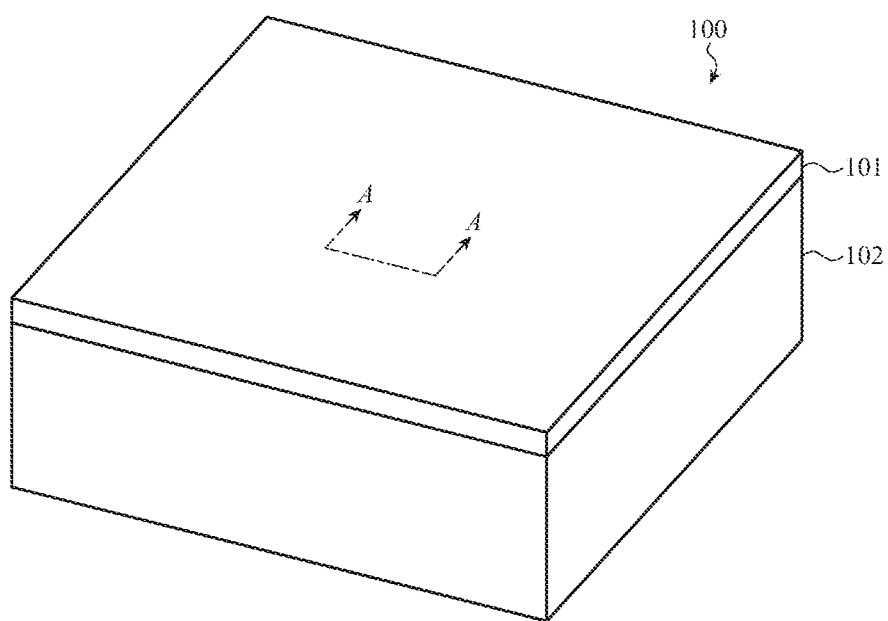
FIG. 1A depicts a first example electronic device that includes an optical module having a beam-tilting enclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample apparatuses, systems, and methods that embody various elements of the present disclosure. However, it should be understood that the described disclosure may be practiced in a variety of forms in addition to those described herein.

An electronic device may include a light source that emits a light beam along an axis. In some electronic devices, the light beam may travel along the axis unchanged through an external surface of the electronic device such that the axis is orthogonal to the external surface. In other electronic devices, the electronic device may use various techniques to tilt the axis.

For example, an electronic device may use one or more light sources that are also sensitive to and generate a detectable response to the contact on, proximity to, and/or movement of objects across an optically transmissive (e.g., optically transmissive to at least one wavelength of light) component, such as a cover glass or other cover. A light source may emit light towards the external surface of the cover glass. If an object is present at the external surface, the light may reflect and/or scatter back to the light source. The light source may be operable to receive and detect the properties of such reflected and/or scattered light. In some situations, the light source may be a light source that only receives light of the same wavelength range as it emits.

Regardless, the light may need to travel through the cover glass such that an axis of the light is at a tilt in order for the light source to detect and characterize the motion of a target in the plane defined by the cover glass. For example, for an object motion in the aforementioned plane, light that travelled with a tilted axis may experience a Doppler shift. Light that did not travel with a tilted axis may not experience a Doppler shift due to the orthogonality of the object motion vector to the propagation vector of light. In this way, the light source may be able to characterize the object motion, but only if the light travels tilted. This is one example where a light source may be configured to transmit light through an external surface of an electronic device tilted with respect to the external surface.

Another application may involve a proximity detector, a flood light emitter, and/or a structured light projector used by a mobile computing device (such as a phone, tablet computing device, laptop computing device, and so on) in facial recognition. In such an example, the proximity detector, flood light emitter, and/or structured light projector may transmit light through a cover glass or other exterior surface with a tilted axis to compensate for a user tendency to hold the mobile computing device at an angle to the user's face. A number of different applications may tilt light from a light source in this way.

Various techniques may be used to accomplish such a tilt. By way of one example, freeform optical elements may be used to tilt the light beam from a light source in a sensor module or other optical module. However, such optics may involve very exacting manufacturing and assembly tolerances. For example, a freeform lens may be used to tilt light in this way, but may have such a steep slope (potentially close to 90 degrees) that even extremely minor errors in placement of the light source may result in a significantly differently tilted light beam than intended. This may cause a large number of costly and inefficient assembly errors that result in unusable modules.

By way of another example, the light source may be mounted at a tilt within an electronic device using a complex system of multiple different structural components. Each of these multiple different structural components may be variously coupled to each other, the electronic device, and the light source. Though light tilt may be accomplished in this manner, the assembly of such a composite structure may be challenging and problematic, particularly at small sizes. This may result in this technique being expensive, inefficient, and error prone. This approach may also cause a large number of costly and inefficient assembly errors that result in unusable modules.

The following disclosure relates to beam-tilting light source enclosures. An enclosure may be coupled to a substrate that includes a light emitter connected thereto. The enclosure may have a geometry such that the enclosure has a first surface configured to couple substantially flat to the substrate and a second surface tilted with respect to the first surface and configured to substantially couple flat to a component of an electronic device through which the light is to project. The enclosure may be optically transmissive (e.g., optically transmissive to at least one wavelength of light) and cover the light source when coupled to the substrate. The enclosure may also be reflective or absorptive for wavelengths other than the wavelength of the light source. In this way, an optical module may be assembled and used in the electronic device by coupling the first surface to the substrate and coupling the second surface to the component. This may accomplish light tilting with substantially reduced assembly errors due to the reduced slope of the lens in a significantly less complex and more cost-efficient fashion than other approaches.

In some embodiments, an optical module may include a unitary optically transmissive enclosure coupled to a substrate over a light emitter on the substrate. The unitary optically transmissive enclosure may include an optical surface that is oriented transverse to the substrate. Light emitted from the light emitter travels through the optical surface at a transverse angle with respect to the optical surface.

In various embodiments, an optically transmissive enclosure may be molded to a substrate around a light emitter on the substrate. The optically transmissive enclosure may include a convex or concave exterior surface that functions as a lens and a coupling surface that is adjacent to the convex or concave exterior surface and is oriented transverse to the substrate. Light emitted from the light emitter is shaped as the light travels through the convex or concave exterior surface at a transverse angle with respect to the coupling surface.

In some embodiments, an electronic device includes a cover glass and an optical module coupled to the cover glass. The optical module includes an optically transmissive enclosure coupled to a substrate over a light emitter. The optical module includes a lens on or defined by an interior surface that shapes (or focuses, collimates, and/or any other shaping) light emitted from the light emitter. The optical module also includes an optical surface through which the light from the light emitter travels that is opposite the lens and positioned parallel to the cover glass and transverse to the substrate.

These and other embodiments are discussed below with reference to FIGS. 1A-11. However, those skilled in the art will readily appreciate that the detailed description given herein with respect to these Figures is for explanatory purposes only and should not be construed as limiting.

Figure 1B:
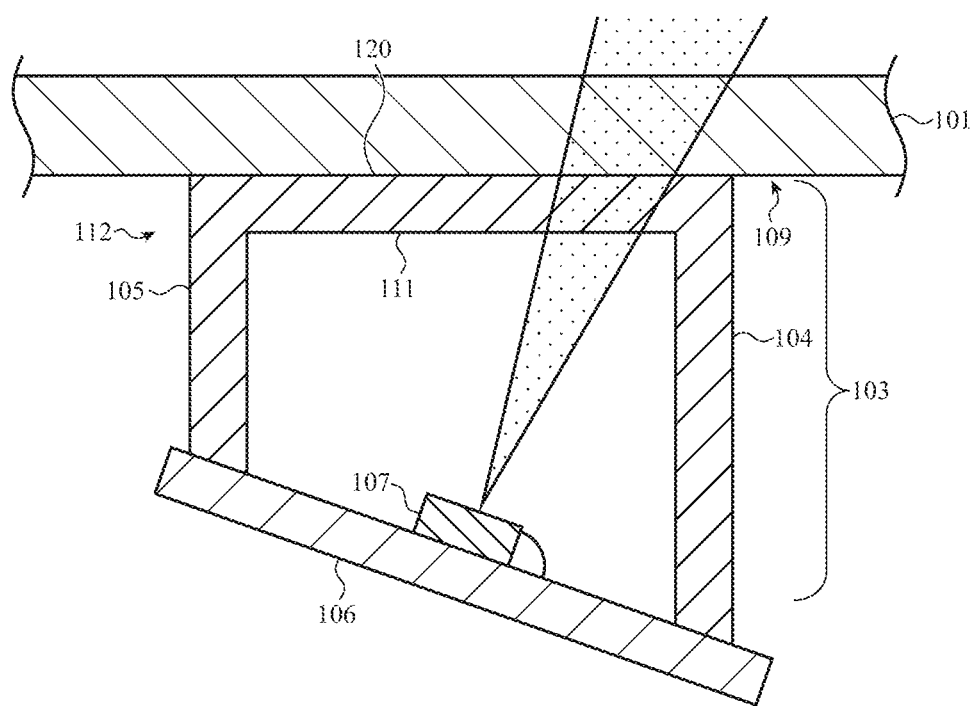
FIG. 1B depicts an example cross-sectional view of the electronic device of FIG. 1A, taken along line A-A of FIG. 1A, illustrating a first example optical module.

FIG. 1A depicts a first example electronic device 100 that includes an optical module having a beam-tilting enclosure. The electronic device 100 includes a cover 101, such as a cover glass, and a housing 102. FIG. 1B depicts an example cross-sectional view of the electronic device 100 of FIG. 1A, taken along line A-A of FIG. 1A, illustrating a first example optical module 103.

The optical module 103 includes a substrate 106 and a light emitter 107 or other light source coupled to the substrate 106. The optical module 103 also includes an optically transmissive (e.g., optically transmissive to at least one wavelength of light) enclosure 112 that can be transmissive or opaque to wavelengths outside the wavelength range of the light emitter 107 and coupled to the substrate 106 over the light emitter 107.

The optically transmissive enclosure 112 includes an optical surface 120 coupled to an interior surface 109 of the cover 101. The optical surface 120 is positioned parallel to the cover 101 and transverse to the substrate 106. The optically transmissive enclosure 112 also includes an interior surface 111 opposite the optical surface 120 and handling surfaces 104, 105 that are adjacent the optical surface 120 and the substrate 106. In this example, the handling surfaces 104, 105 are flat handling surfaces that are oriented transverse to the optical surface 120 and the substrate 106.

Light from the light emitter 107 travels through the optically transmissive enclosure 112 from the interior surface 111 through the optical surface 120 while having a tilted axis. The light that travels through the optical surface 120 then travels through the cover 101 with a tilted axis.

In FIG. 1B, the effects of refraction have been omitted for the purposes of simplicity. In other words, ray angles are not shown to change while light is going into one material from another. In various implementations, ray angles may change while light is going into one material to another due to diffraction without departing from the scope of the present disclosure.

Figure 2:
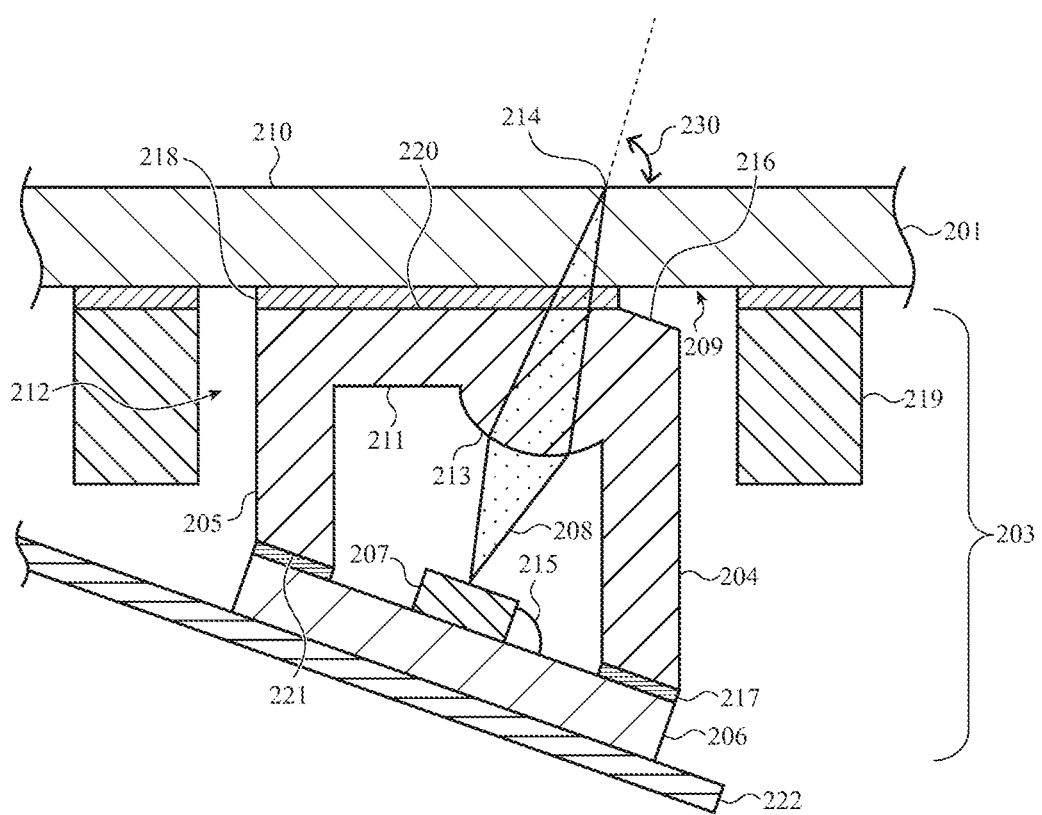
FIG. 2 depicts a second example optical module.

FIG. 2 depicts a second example optical module 203. Similar to the optical module 103 of FIG. 1B, the optical module 203 includes an optically transmissive enclosure 212 coupled to a substrate 206 (such as via an adhesive 217 that connects a coupling surface 221 of the optically transmissive enclosure 212 to the substrate 206) over a light emitter 207. Likewise, the optically transmissive enclosure 212 includes an optical surface 220 that is transverse to the substrate 206 and is coupled to an interior surface 209 of a cover 201 (such as a cover glass), such as via an adhesive 218.

Contrasted with the optical module 103 of FIG. 1B, the optical module 203 includes a lens 213. In this example, the lens 213 shapes light 208 from the light emitter 207 as the light 208 travels at a tilt through the lens 213 and the optically transmissive enclosure 212 from the interior surface 211 to the optical surface 220 and through the cover 201 from an interior surface 209 to a point 214 on an exterior surface 210.

In this example, the lens 213 (and other lenses discussed below) is shown to be a refractive lens. However, in various implementations, other kinds of lenses may be used. For example, in other examples, the lens 213 (and other lenses discussed below) may be a diffractive lens (such as a Fresnel lens, a grating-based lens, and so on), a gradient refractive index lens, a lens based on sub-wavelength elements, and so on without departing from the scope of the present disclosure.

230 illustrate s transverse angle between the tilted axis of the light 208 and the exterior surface 210 of the cover 201. By extension, as the optical surface 220 is positioned parallel to the interior surface 209 and the exterior surface 210 of the cover 201, 230 also corresponds to the transverse angles between the tilted axis of the light 208 and the optical surface 220.

Thus, the light 208 may be tilted with substantially reduced assembly errors in a significantly less complex and more cost-effective fashion than other approaches. Similarly, the optical module 203 may be assembled and coupled to the cover 201 with substantially reduced assembly errors in a significantly less complex and more cost-effective fashion than other approaches.

Similar to the optical module 103 of FIG. 1B, the optical module 203 includes handling surfaces 204, 205, which are shown as flat handling surfaces. The parallel orientation of the handling surfaces 204, 205 may allow machines or humans to handle the optical module 203 (such as during assembly of the optical module 203, transport of the optical module 203, coupling of the optical module 203 to the cover 201, and so on) from the sides in the illustrated orientation despite the irregular geometry.

Further, as contrasted with the optical module 103 of FIG. 1B, the optical module 203 includes an additional handling surface 216. The handling surface 216 is substantially flat and substantially parallel to the substrate 206. The parallel orientation of the handling surface 216 and the substrate 206 may allow machines or humans to handle the optical module 203 from an axis aligned with the handling surface 216 and the substrate 206 despite the irregular geometry. This provides additional flexibility in handling the optical module 203 (such as during assembly of the optical module 203, transport of the optical module 203, coupling of the optical module 203 to the cover 201, and so on) over the optical module 103 of FIG. 1B.

One or more alignment mechanisms 219 may be coupled to and/or in contact with the cover 201. Such an alignment mechanism 219 may aid a machine or human in coupling the optical module 203 to the cover 201.

For example, the alignment mechanism 219 may be an alignment ring coupled to the cover 201. The alignment ring may define an area. The area defined by the alignment ring may guide a machine or human when placing the optical module 203 to the cover 201. As such, the optically transmissive enclosure 212 may be at least partially positioned in the area defined by the alignment ring. In some implementations, the alignment mechanism 219 may be removed after the optical module 203 is coupled to the cover 201.

In this example, the lens 213 is defined by the interior surface 211 of the optically transmissive enclosure 212. Thus, the lens 213 is a shaped surface of the optically transmissive enclosure 212. However, it is understood that this is an example. In various implementations, the lens may be a separate component coupled to the optically transmissive enclosure 212.

In this example, the lens 213 does not bend the light 208 as the light 208 travels through the lens 213. However, in other examples, the lens 213 may be tilted with respect to the substrate 206 or otherwise configured to bend or deflect the light 208. Alternatively, other components may be used to bend or deflect the light 208. Various configurations are possible and contemplated without departing from the scope of the present disclosure.

In some examples, the optically transmissive enclosure 212 may be a unitary structure. This may reduce complexity in optical module 203 assembly over multiple piece structures. In other examples, the optically transmissive enclosure 212 may be a composite structure.

In various examples, the optically transmissive enclosure 212 may be formed of a material that is optically transmissive (e.g., optically transmissive to at least one wavelength of light). In other words, the material may be transparent, translucent, or otherwise allow light to pass through. Such a material may be glass, polymer, and/or various other optically transmissive substances.

Although optically transmissive enclosure 212 is illustrated and described as being entirely optically transmissive, it is understood that this is an example. In some implementations, one or more portions of the optically transmissive enclosure 212 may not be optically transmissive. For example, the portions may be coated with a substance that is not optically transmissive. By way of another example, the portions may be doped with and/or otherwise contain particles that are not optically transmissive. In still other examples, the optically transmissive enclosure 212 may be a composite structure of optically transmissive and non-optically transmissive components where the portions correspond to the non-optically transmissive components. Various configurations are possible and contemplated without departing from the scope of the present disclosure.

For example, in some implementations, the optically transmissive enclosure 212 may be formed of an optically transmissive material with one or more thin-film optical filters coupled thereto. Such thin-film optical filters may selectively transmit some wavelengths of light while blocking others.

In some examples, the optically transmissive enclosure 212 and the substrate 206 may form a sealed cavity around the light emitter 207. This may prevent dust, moisture, or other contaminants from damaging the light emitter 207 and/or obstructing the light 208. In other examples, the optically transmissive enclosure 212 and the substrate 206 may form a cavity with one or more openings around the light emitter 207. In such an example, other techniques may be used to compensate the light 208 for dust, moisture, or other contaminants.

The substrate 206 may include circuitry and/or conductive pathways. The substrate 206 may be formed of a ceramic, printed circuit board, flexible circuit, and so on.

The light emitter 207 may be electrically coupled to one or more conductive pads or traces on the substrate 206 via one or more wire bonds 215 and/or another electrical connection mechanism. The substrate 206 may be electrically connected to one or more other components, such as one or more interconnected processing units, input/output components, communication components, non-transitory storage media (which may take the form of, but is not limited to, a magnetic storage medium; optical storage medium; magneto-optical storage medium; read only memory; random access memory; erasable programmable memory; flash memory; and so on), and so on. For example, the substrate 206 may be electrically connected to one or more such other components via a flexible circuit 222 or other electrical connection mechanism.

The optical module 203 may be used for a variety of different purposes. In some implementations, a light emitter 207 that produces a measureable response to the reflection and/or backscatter of its own light 208 onto itself may be used. If such a light emitter 207 is based on a resonant optical cavity and exhibits coherent emission, the light emitter 207 may be mainly sensitive to its own light 208. For example, the light emitter 207 may be a coherent or partially coherent surface-emitting semiconductor light source (e.g., a vertical-cavity surface-emitting laser (VCSEL), a vertical external-cavity surface-emitting laser (VECSEL), or a light-emitting diode (LED) (e.g., a resonant-cavity LED (RC-LED), a superluminescent LED (SLED), and so on), or the like. In some implementations, the light emitter 207 may also be an incoherent emitter such as an organic LED (OLED), a micro LED (mLED), or the like. The light emitter 207 may transmit the light 208 and efficiently receive reflected and/or backscattered light back if there is an object at the close vicinity of the point 214 on the exterior surface 210 on the cover 201. Movement of an object in the plane of the exterior surface 210 can then be characterized by determining the frequency of the Doppler shift experienced by the backscattered light 208. The information enabling the calculation of the Doppler shift may be obtained using one or more signals from the light emitter 207. For a light 208 that is not tilted, a Doppler shift does not occur due to the orthogonality of the object motion vector and light propagation direction. IN addition to the object movement, the backscattered light 208 can be used to detect the presence and/or proximity of an object to the exterior surface 210.

However, it is understood that this is an example. In various implementations, the optical module 203 may be used to tilt the light from the light emitter 207 for other purposes without departing from the scope of the present disclosure.

Although the optically transmissive enclosure 212 is illustrated and described as having a particular geometry, it is understood that this is an example. Other configurations are possible and contemplated without departing from the scope of the present disclosure.

Figure 3:
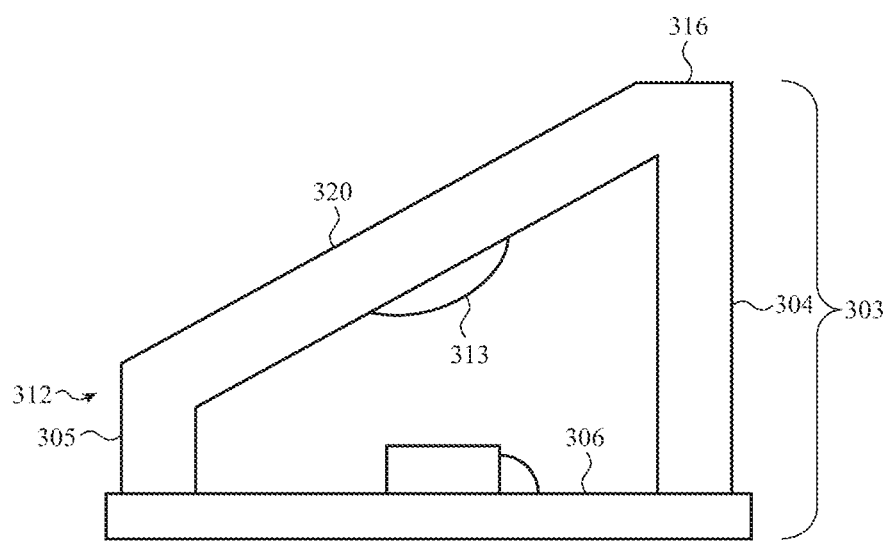
FIG. 3 depicts a third example optical module.

By way of illustration, FIG. 3 depicts a third example optical module 303. Similar to the optical module 203 of FIG. 2, the optical module 303 includes a substrate 306 and an optically transmissive enclosure 312 that has an optical surface 320 and handling surfaces 304, 305, 316. However, the optical surface 320 and the handling surfaces 304, 305, 316 are differently sized and are angled differently with respect to each other than the optical surface 220 and handling surfaces 204, 205, 216 of the optical module 203 of FIG. 2. For example, the handling surfaces 304, 305 are transverse with respect to the optical surface 320 whereas the handing surfaces 204, 205 are substantially perpendicular to the optical surface 220 of the optical module 203 of FIG. 2. Further, the optical module 303 includes a separate lens 313 coupled to the optically transmissive enclosure 312.

Figure 4:
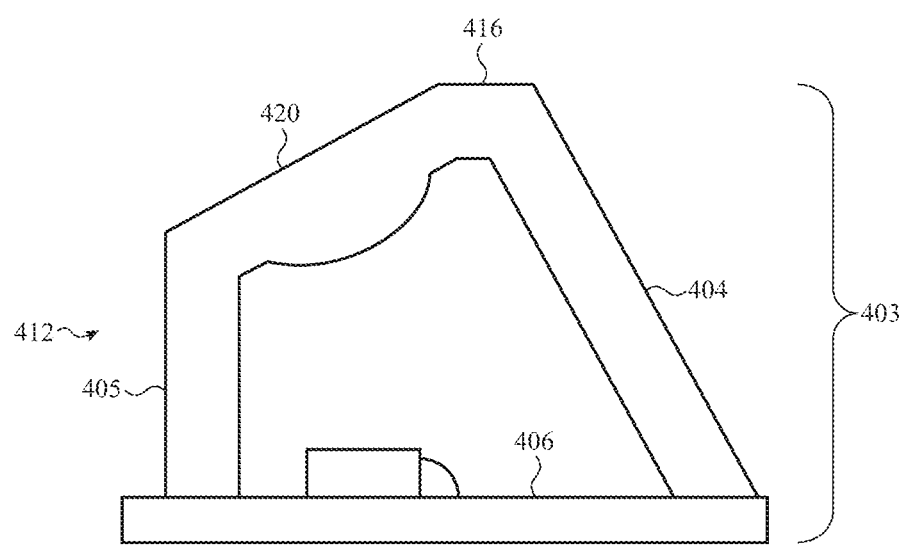
FIG. 4 depicts a fourth example optical module.

In another example, FIG. 4 depicts a fourth example optical module 403. Similar to the optical module 303 of FIG. 3, the optical module 403 has an optically transmissive enclosure 412 coupled to a substrate 406 that has an optical surface 420 and handling surfaces 404, 405, 416 that are differently sized and are angled differently with respect to each other than the optical surface 220 and handling surfaces 204, 205, 216 of the optical module 203 of FIG. 2. By way of contrast with the optical module 303 of FIG. 3, the optical surface 420 of the optical module 403 has a smaller size than the optical surface 320 of the optical module 303 of FIG. 3.

Figure 5:
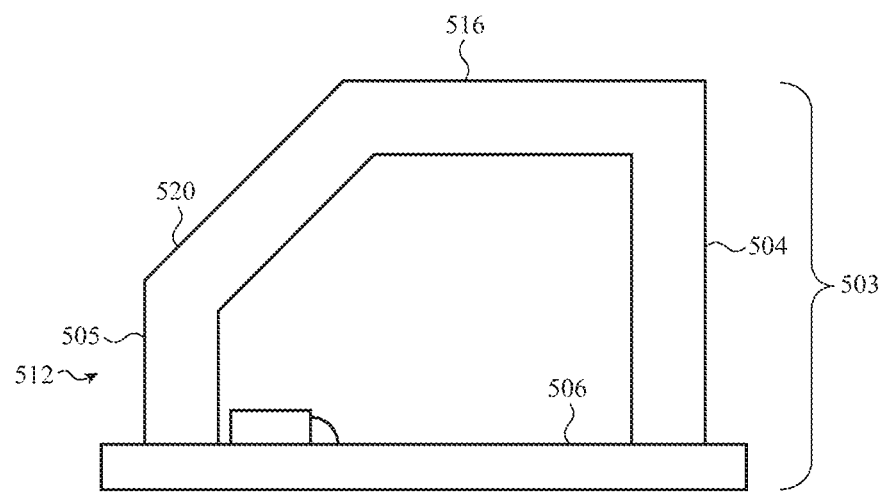
FIG. 5 depicts a fifth example optical module.

Likewise, the optical module 503 of FIG. 5 has an optically transmissive enclosure 512 coupled to a substrate 506 that has an optical surface 520 and handling surfaces 504, 505, 516 where the optical surface 520 is even smaller than the optical surface 420 of the optical module 403 of FIG. 4. Further, the handling surface 516 is substantially larger than the handling surface 416 of the optical module 403 of FIG. 4. Moreover, the optical module 503 omits a lens.

However, it is understood that this is an example. In various implementations, a lens may be formed at and/or coupled to and inner portion of the optically transmissive enclosure 512 opposite the optical surface 520 without departing from the scope of the present disclosure.

Figure 6:
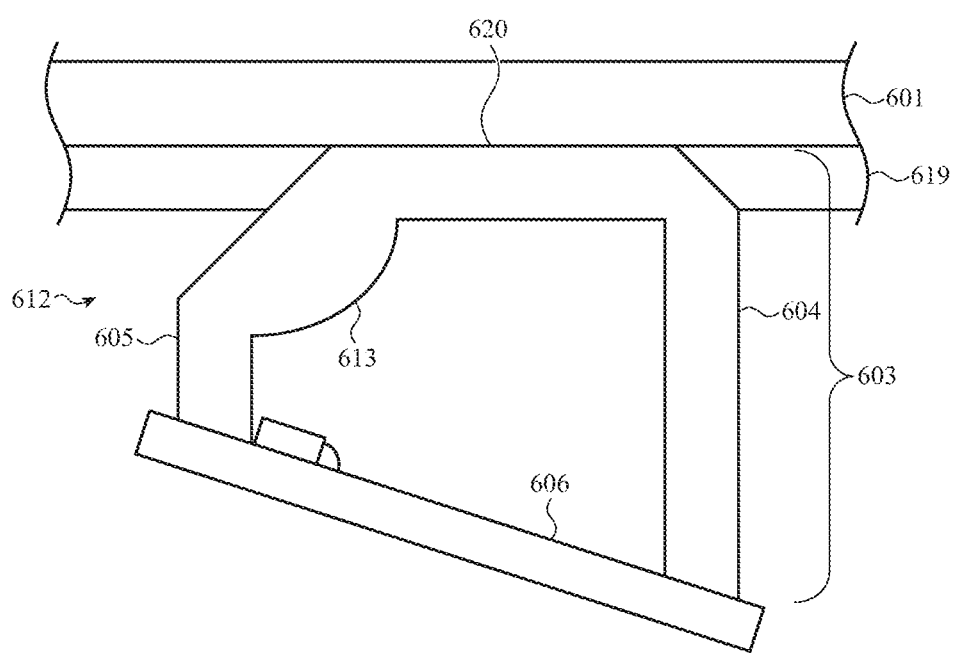
FIG. 6 depicts a sixth example optical module.

FIG. 6 depicts a sixth example optical module 603. Similar to the optical module 203 of FIG. 2, the optical module 603 includes a substrate 606 and an optically transmissive enclosure 612 that has an optical surface 620 and handling surfaces 604, 605. However, the optically transmissive enclosure 612 has sloped (such as chamfered, beveled, and so on) edges adjacent to the optical surface 620 and the handling surfaces 604, 605. These sloped edges mate with sloped edges of an alignment mechanism 619 as compared to the gap defined between the optically transmissive enclosure 212 and the alignment mechanism 219 of FIG. 2. Various configurations are possible and contemplated without departing from the scope of the present disclosure.

In this example, the optically transmissive enclosure 612 defines a lens 613. In some examples, this lens 613 may beam-tilt light passing through the lens 613. As the axis of the lens 613 may already be tilted to sufficiently beam-tilt the light, the optically transmissive enclosure 612 may be differently shaped in some embodiments so that the substrate 606 is parallel to the cover 601 instead of being tilted with respect to the cover 601 as shown.

Further, although FIG. 2 illustrates a single optical module 203 that transmits light 208 at an angle with respect to the cover 201, it is understood that this is an example. Other configurations are possible and contemplated without departing from the scope of the present disclosure.

Figure 7:
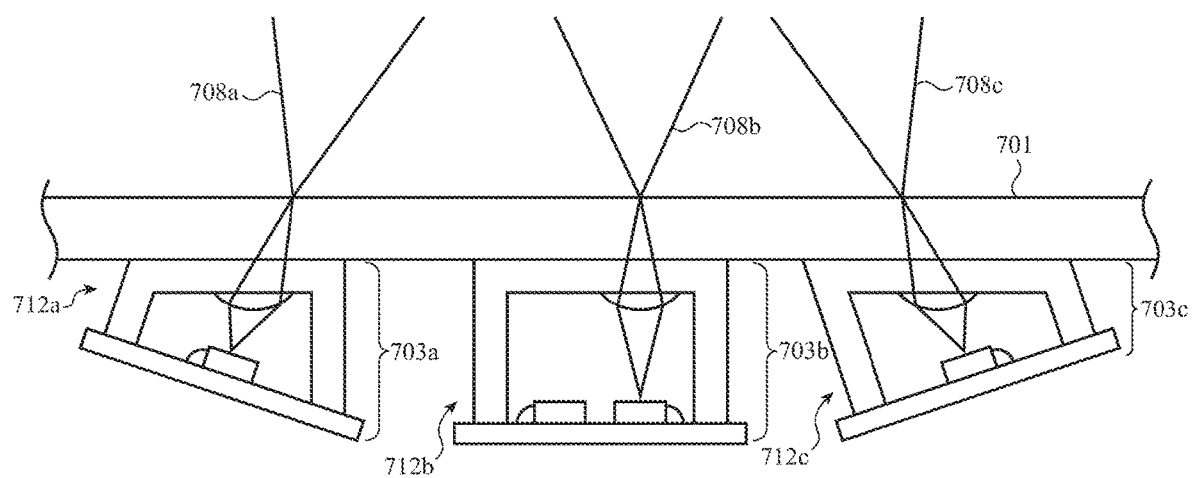
FIG. 7 depicts an example assembly including multiple different optical modules.

By way of a first example, FIG. 7 depicts an example assembly including multiple different optical modules 703a-703c coupled to a cover 701, such as a cover glass. Each of the optical modules 703a-703c include optically transmissive enclosures 712a-712c that have different geometries. Each of the optical modules 703a-703c may respectively transmit light 708a-708c having axes at different angles with respect to the cover 701.

As shown, the optical module 703b may transmit light 708b through the cover 701 without a tilt. In an implementation where the optical module 703b was used to detect the movement of the object across the cover 701, a detection technique based on determining the Doppler frequency shift of the reflected and/or backscattered light 708b may not be used as the orthogonality of the movement and light 708b propagation directions may prevent a Doppler shift from occurring. However, the optical module 703b may still be used to detect the contact and/or proximity of an object to the cover 701. Various configurations are possible and contemplated without departing from the scope of the present disclosure.

In still other examples, an optical module may include multiple light emitters. In such an example, a lens (such as a lens that is concave with respect to the light emitters) may be defined or disposed over multiple of the light sources. This may allow light from each of the light emitters to travel at different angles. Various configurations are possible and contemplated without departing from the scope of the present disclosure.

Additionally, although the optical module 203 of FIG. 2 is illustrated and described above as transmitting light 208 through the same surface of the optically transmissive enclosure 212 that is coupled to the cover 201, it is understood that this is an example. Various configurations are possible and contemplated without departing from the scope of the present disclosure.

Figure 8:
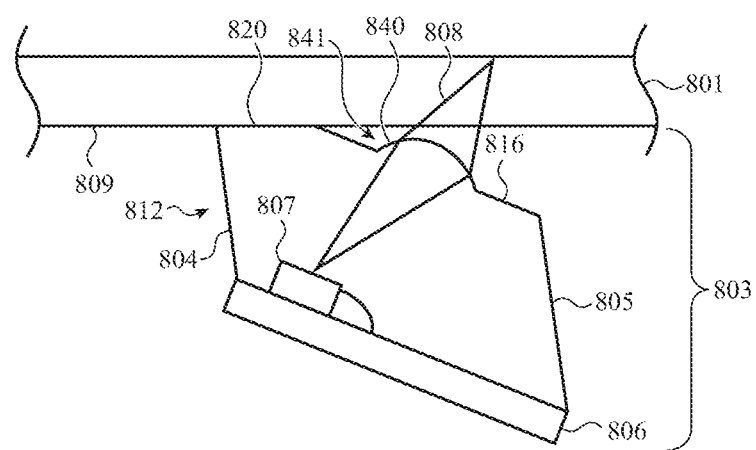
FIG. 8 depicts a seventh example optical module.

For example, FIG. 8 depicts a seventh example optical module 803. The optical module 803 includes an optically transmissive enclosure 812 molded to a substrate 806 over a light emitter 807. The optically transmissive enclosure 812 may be formed of an optically transmissive material, such as a polymer, that is overmolded over the substrate 806 and light emitter 807. The optically transmissive enclosure 812 and substrate 806 may completely and/or substantially completely surround the light emitter 807 such that the optically transmissive enclosure 812 at least partially encapsulates the light emitter 807.

The optically transmissive enclosure 812 may include a curved exterior surface 840 and a coupling surface 820 adjacent to the curved exterior surface. The curved exterior surface 840 may function as a lens to shape light 808 from the light emitter 807. For example, the light 808 emitted from the light emitter 807 may be shaped by the curved exterior surface 840 as the light 808 travels through the curved exterior surface 840 at a transverse angle with respect to a coupling surface 820.

The optically transmissive enclosure 812 may also include a coupling surface 820 that is adjacent the interior surface 809 of the cover 801 (which may be a cover glass). The coupling surface 820 may not be an optical surface as the light 808 passes through the curved exterior surface 840 instead of the coupling surface 820. As such, the curved exterior surface 840 may be the optical surface in this example.

The curved exterior surface 840 may be convex with respect to the cover 801 (and/or the substrate 806) and define a gap 841 between the curved exterior surface 840 and an interior surface 809 of the cover 801. In some implementations, this gap 841 may be filled with a gas, such as air.

In other implementations, the gap 841 may be filled by another substance. In some examples of such other implementations, the substance may be one that has a refractive index that is the same or substantially the same as the gas, the optically transmissive enclosure 812, and/or the cover 801 to prevent differences in the refractive index from bending the light 808.

In various implementations, the gap 841 may be configured to bend or deflect the light 808 as the light 808 travels through the curved exterior surface 840. For example, the gap 841 may be filled with a substance having a substantially different refractive index than the optically transmissive enclosure 812, and/or the cover 801.

The optically transmissive enclosure 812 may further include handling surfaces 804, 805, 816. The handling surface 816 may be a planar surface that is parallel to the substrate 806 and adjacent to the curved exterior surface 840.

Although the optical module 803 is illustrated and described as having an optically transmissive enclosure 812 that includes the curved exterior surface 840, it is understood that this is an example. In various implementations, the curved exterior surface 840 may be omitted. In some examples of such implementations, a lens may be coupled to the optically transmissive enclosure 812 in place of the curved exterior surface 840.

The optical modules 103-803 of FIGS. 1B-8 are illustrated and described as used as part of a system that transmits and receives reflected and/or backscattered light to detect touch of an object on, proximity of an object to, and/or movement of an object across a cover. However, it is understood that these are examples. In other implementations, one or more optical modules may be used to implement a proximity detector, flood light emitter, and/or structured light projector used in facial recognition.

Figure 9:
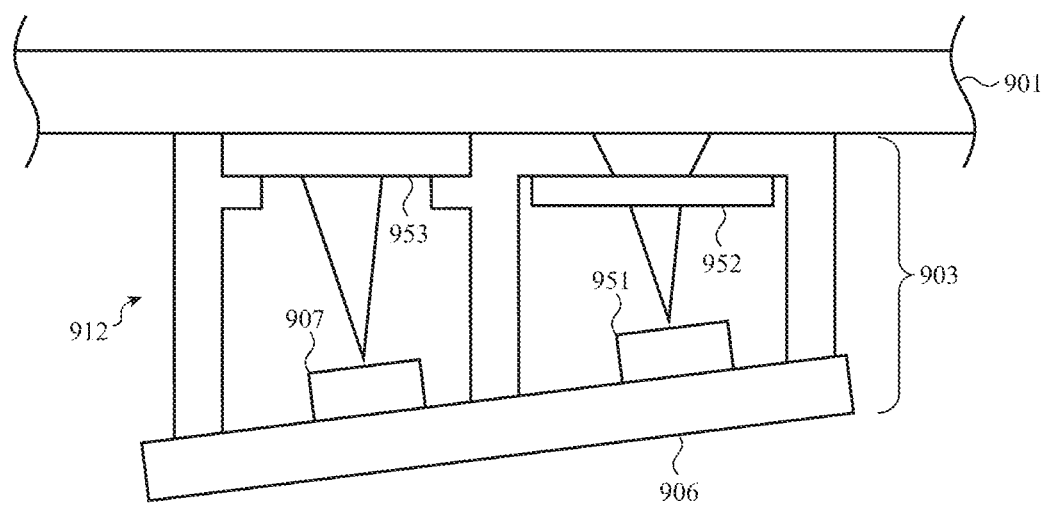
FIG. 9 depicts an eighth example optical module.

For example, FIG. 9 depicts an eighth example optical module 903 coupled to an exterior glass component 901. The optical module 903 includes an enclosure 912 coupled to a substrate 906. A diffuser 953 may be coupled to the enclosure 912 over a flood emitter 907 that is coupled to the substrate 906. Further, a filter glass 952 may be coupled to the enclosure 912 over a transmitter and receiver 951 that is part of a proximity sensor. The enclosure 912 may couple the substrate 906 to the exterior glass component 901 such that the substrate 906, the flood emitter 907, and/or the proximity sensor transmitter and receiver 951 are positioned transverse to the exterior glass component 901.

Although the enclosure 912 is illustrated and described as a connected assembly of components including the diffuser 953 and the filter glass 952, it is understood that this is an example. In various implementations, the enclosure 912 may be a unitary optically transmissive enclosure as discussed above without departing from the scope of the present disclosure. In some examples, such a unitary optically transmissive enclosure may be configured with different regions that function as a diffuser and/or an optical filter. In other examples, a diffuser and/or an optical filter may be coupled to one or more regions of such a unitary optically transmissive enclosure. In still other implementations, a separate unitary optically transmissive enclosure may be coupled to the substrate 906 over each of the flood emitter 907 and/or the proximity sensor transmitter and receiver 951. Various configurations are possible and contemplated without departing from the scope of the present disclosure.

Figure 10:
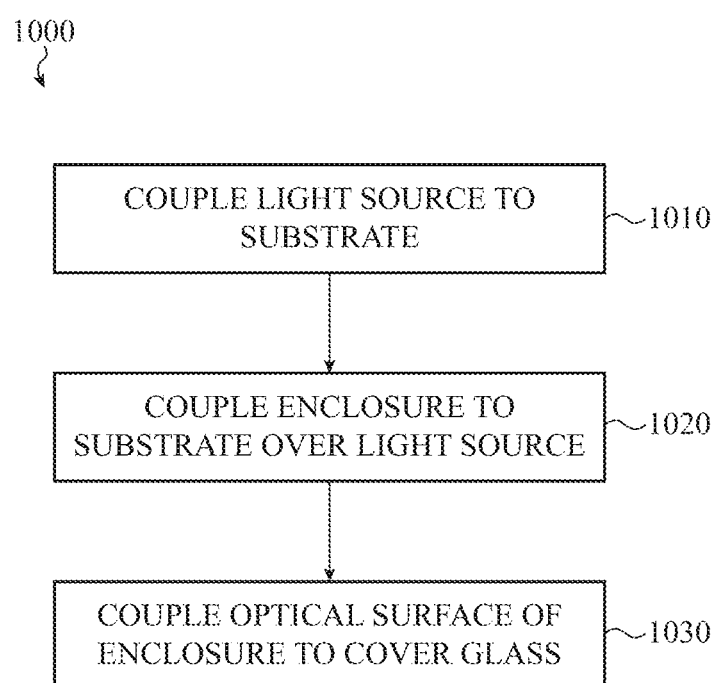
FIG. 10 depicts a flow chart illustrating a first example method for assembling an optical module and including the optical module in an electronic device. This first example method may assemble one or more of the optical modules of FIGS. 1B-7.

FIG. 10 depicts a flow chart illustrating a first example method 1000 for assembling an optical module and including the optical module in an electronic device. This first example method 1000 may assemble one or more of the optical modules 103-703 of FIGS. 1B-7.

At 1010, a light source or other light emitter may be coupled to a substrate. In some implementations, the light source may be a surface-emitting semiconductor light source, such as a VCSEL), a VECSEL, an LED (such as an OLED, a RC-LED, a mLED, a SLED, and so on), or the like. At 1020, an enclosure is coupled to the substrate over the light source. The enclosure may be optically transmissive. The enclosure may be a unitary structure. The enclosure may define an optical surface transverse to the substrate through which the light source is configured to project. At 1030, the optical surface of the enclosure is coupled to a cover (such as a cover glass) or other external component of the electronic device.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as both assembling the optical module and including the optical module in an electronic device. However, it is understood that this is an example. In various implementations, one or more of 1010 and 1020 or 1030 may be omitted and the method 1000 used to either assemble the optical module or include the optical module in an electronic device without departing from the scope of the present disclosure. Various configurations are possible and contemplated.

Figure 11:
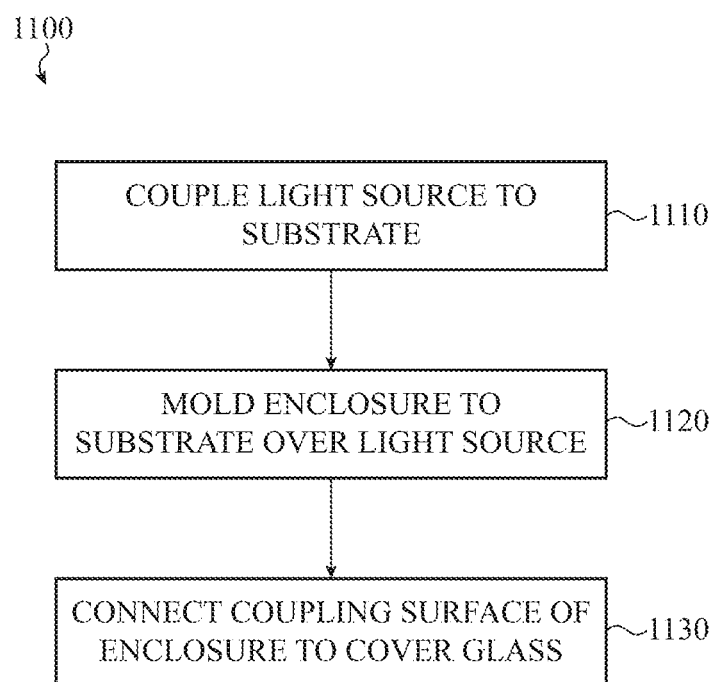
FIG. 11 depicts a flow chart illustrating a second example method for assembling an optical module and including the optical module in an electronic device. This second example method may assemble the optical module of FIG. 8.

FIG. 11 depicts a flow chart illustrating a second example method 1100 for assembling an optical module and including the optical module in an electronic device. This second example method 1100 may assemble the optical module 803 of FIG. 8.

At 1110, a light source or other light emitter may be coupled to a substrate. At 1020, an enclosure is molded to the substrate over the light source. The enclosure may be molded to the substrate as part of an overmolding process. The enclosure may be optically transmissive. The enclosure may be a unitary structure. The enclosure may define a coupling surface. The enclosure may define a convex or concave surface operable to function as a lens. The enclosure may be molded to the substrate over the light source such that the light source is configured to emit light through the convex or concave surface. At 1130, the coupling surface of the enclosure is connected to a cover (such as a cover glass) or other external component of the electronic device.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 is illustrated and described as both assembling the optical module and including the optical module in an electronic device. However, it is understood that this is an example. In various implementations, one or more of 1110 and 1120 or 1130 may be omitted and the method 1100 used to either assemble the optical module or include the optical module in an electronic device without departing from the scope of the present disclosure. Various configurations are possible and contemplated.

As described above and illustrated in the accompanying figures, the present disclosure relates to beam-tilting light source enclosures. An enclosure may be coupled to a substrate that includes a light emitter coupled thereto. The enclosure may have a geometry such that the enclosure has a first surface configured to couple substantially flat to the substrate and a second surface tilted with respect to the first surface and configured to substantially couple flat to a component of an electronic device through which the light is to project. The enclosure may be optically transmissive and cover the light source when coupled to the substrate. In this way, an optical module may be assembled and used in the electronic device by coupling the first surface to the substrate and coupling the second surface to the component. This may accomplish light tilting with substantially reduced assembly errors in a significantly less complex and more cost-efficient fashion than other approaches.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An optical module, comprising:
   a substrate;
   a light emitter coupled to the substrate;
   an enclosure, coupled to the substrate over the light emitter, comprising a flat optical surface that is oriented transverse to the substrate;
   a first flat handling surface directly adjacent the flat optical surface; and
   a second flat handling surface opposite and parallel to the first flat handling surface; wherein:
   light emitted from the light emitter travels through the flat optical surface at a transverse angle with respect to the flat optical surface;
   the first flat handling surface and the second flat handling surface are transverse to the flat optical surface; and
   a first length of the first flat handling surface is less than a second length of the second flat handling surface.

2. The optical module of claim 1, wherein the second length is between the substrate and the flat optical surface.

3. The optical module of claim 1, wherein the first flat handling surface and the second flat handling surface are transverse to the substrate.

4. The optical module of claim 1, wherein the first flat handling surface and the second flat handling surface are parallel to each other.

5. The optical module of claim 1, wherein at least a portion of the enclosure is optically transmissive.

6. The optical module of claim 1, further comprising a flat surface that:
   is adjacent the flat optical surface;
   is parallel to the substrate;
   is contiguous with the flat optical surface; and
   forms a corner with the flat optical surface.

7. The optical module of claim 6, wherein:
   the corner is a first corner; and
   the flat surface forms a second corner with the first flat handling surface.

8. The optical module of claim 1, further comprising a lens that shapes the light emitted from the light emitter.

9. The optical module of claim 8, wherein the lens is coupled to the enclosure.

10. The optical module of claim 1, wherein the enclosure functions as a lens that shapes the light emitted from the light emitter.

11. The optical module of claim 1, wherein the light emitter comprises at least one of a vertical-cavity surface-emitting laser (VCSEL), a vertical external-cavity surface-emitting laser (VECSEL), a light-emitting diode (LED), a resonant-cavity LED (RC-LED), a superluminescent LED (SLED), an organic LED (OLED), or a micro LED (mLED).

12. The optical module of claim 1, wherein the light emitter is electrically coupled to one or more conductive pads or traces on the substrate via one or more wire bonds.

13. The optical module of claim 1, wherein the enclosure is coupled to the substrate by adhesive.

14. The optical module of claim 1, wherein the substrate comprises a ceramic, a printed circuit board, or a flexible circuit.

15. The optical module of claim 1, wherein a portion of the enclosure is doped with a particle that is not optically transmissive.

16. An electronic device, comprising:
    a cover; and
    an optical module coupled to the cover, comprising:
      a substrate;
      a light emitter coupled to the substrate; and
      an enclosure, coupled to the substrate over the light emitter, comprising a flat optical surface that is oriented transverse to the substrate;
      a first flat handling surface directly adjacent the flat optical surface; and
      a second flat handling surface opposite and parallel to the first flat handling surface; wherein:
      light emitted from the light emitter travels through the flat optical surface at a transverse angle with respect to the flat optical surface;
      the first flat handling surface and the second flat handling surface are transverse to the flat optical surface; and
      a first length of the first flat handling surface is less than a second length of the second flat handling surface.

17. The electronic device of claim 16, wherein the substrate is connected to one or more processing units, input/output components, communication components, or non-transitory storage media.

18. The electronic device of claim 17, wherein the substrate is connected via a flexible circuit.

19. The electronic device of claim 16, further comprising a thin-film optical filter coupled to the enclosure.

20. The electronic device of claim 19, wherein the thin-film optical filter transmits a first wavelength of light while blocking a second wavelength of light.

* * * * *